US008180795B2

(12) United States Patent
Hanna et al.

(10) Patent No.: US 8,180,795 B2
(45) Date of Patent: May 15, 2012

(54) APPARATUS AND METHOD FOR DISTRIBUTION OF A REPORT WITH DYNAMIC WRITE-BACK TO A DATA SOURCE

(75) Inventors: Todd Russell Hanna, West Vancouver (CA); Ryan Wayne Hanna, Vancouver (CA); Ken Chi Ho Wong, Burnaby (CA); Terry Penner, Burnaby (CA)

(73) Assignee: Business Objects Software Ltd., Dublin (IE)

( * ) Notice: Subject to any disclaimer, the term of this patent is extended or adjusted under 35 U.S.C. 154(b) by 368 days.

(21) Appl. No.: 11/871,958

(22) Filed: Oct. 12, 2007

(65) Prior Publication Data

US 2009/0099881 A1 Apr. 16, 2009

(51) Int. Cl.
*G06F 17/30* (2006.01)
*G06F 17/00* (2006.01)
(52) U.S. Cl. .................. 707/783; 707/803; 715/255
(58) Field of Classification Search .............. 705/1, 10; 707/1, 9, 10, 100, 101, 102, 104.1, 200, 201, 707/203, 205, 783, 803, 805, 999.009; 709/223, 709/229, 203, 226; 715/221, 255
See application file for complete search history.

(56) References Cited

U.S. PATENT DOCUMENTS

| 7,050,961 | B1 * | 5/2006 | Lee et al. ...................... 709/203 |
| 7,496,836 | B2 * | 2/2009 | Hanson et al. ................. 715/234 |
| 7,650,576 | B2 | 1/2010 | Becerra, Jr. |
| 7,702,639 | B2 * | 4/2010 | Stanley et al. .............. 707/999.1 |
| 7,840,600 | B1 * | 11/2010 | Bhatia ........................... 707/793 |
| 7,958,147 | B1 * | 6/2011 | Turner et al. .................. 707/783 |
| 7,984,383 | B2 | 7/2011 | Schell et al. |
| 7,992,078 | B2 | 8/2011 | Penner et al. |
| 2003/0233366 | A1 * | 12/2003 | Kesselman et al. ........... 707/100 |
| 2007/0006144 | A1 | 1/2007 | Tsai et al. |
| 2007/0219794 | A1 * | 9/2007 | Park et al. ...................... 704/246 |
| 2008/0120670 | A1 * | 5/2008 | Easton et al. ................. 725/115 |
| 2008/0208906 | A1 | 8/2008 | Penner |
| 2008/0250157 | A1 * | 10/2008 | Ohata .......................... 709/236 |

* cited by examiner

*Primary Examiner* — Marc Filipczyk
(74) *Attorney, Agent, or Firm* — Mintz, Levin, Cohn, Ferris, Glovsky and Popeo, P.C.

(57) ABSTRACT

A computer readable medium includes executable instructions to integrate a write-back module in a report document, to publish to a recipient the report document and metadata identifying the recipient, and to update a data source based on received write-back information, including the metadata identifying the recipient.

19 Claims, 6 Drawing Sheets

Member Out-of-Pocket Comparison - California Small Group Plans

Choose a Traditional Plan
- Blue Cross
- Blue Shield
  - Spectrum 2600 — 404
  - Spectrum 3400
  - Spectrum 4800
  - Spectrum PPO $0 Deductible
  - Spectrum PPO $0 Deductible(Va
  - Spectrum PPO 250 Premier
  - Spectrum PPO 250 Standard
  - Spectrum PPO Plan 1000
  - Spectrum PPO Plan 3000
  - Spectrum PPO Plan 500
  - Access+ HMO Plan 20
  - Access+ HMO Plan 40
- CalChoice Choose a High-Deductible Plan — 410
- Aetna
- Blue Cross
- Blue Shield
  - Cal Choice — 406
  - BS PPO 2400
- HealthNet
- Kaiser
- Nationwide
- PacificCare Coverage Type: Employee Only — 408

Claims Scenarios: Considerable

Considerable Claims Scenario — 412

| | Cost ($) | Frequency |
|---|---|---|
| Office Visit(s) | $75 | 8 |
| Lab/X-ray(s) | $400 | 4 |
| Inpatient Surgery(ies) | $12,500 | 0 |
| Outpatient Surgery(ies) | $4,000 | 0 |
| Emergency Room | $2,000 | 1 |
| Brand Rx | $100 | 8 |
| Generic Rx | $30 | 5 |

Blue Shield Spectrum 3400
- How much does the EmployEE pay per month for this plan? $400 — 414
- How much does the EmployER contribute per month into the HSA? $200 — 414

Cal Choice BS PPO 2400
- How much does the EmployEE pay per month for this plan? $200 — 416
- How much does the EmployER contribute per month into the HSA? $200 — 416

Employee Cost Comparison — 418

| | Blue Shield Spectrum 3400 | Cal Choice BS PPO 2400 |
|---|---|---|
| Annual Premium | $4,800 | $2,400 |
| + Medical Costs | $4,056 | $3,006 |
| − HSA | $2,400 | $2,400 |
| = Net Expenses | $6,456 | $3,006 |
| HSA Balance | $0 | $0 |

APPARATUS AND METHOD FOR DISTRIBUTION OF A REPORT WITH DYNAMIC WRITE-BACK TO A DATA SOURCE

FIELD OF THE INVENTION

The present invention relates generally to data retrieval and processing. More particularly, this invention relates to the dynamic modification of stored data using a published report.

BACKGROUND OF THE INVENTION

Business Intelligence (BI) generally refers to software tools used to improve business enterprise decision-making. These tools are commonly applied to financial, human resource, marketing, sales, service provider, customer, and supplier analyses. More specifically, these tools can include reporting and analysis tools for presenting information, content delivery infrastructure systems for delivering and managing reports and analytics, and data warehousing systems for cleansing and consolidating information from disparate sources. BI tools may work with data management systems, such as relational databases or On Line Analytic Processing (OLAP) systems used to collect, store, and manage raw data.

There are a number of commercially available BI products that produce reports from stored data, such as Crystal Reports™, BusinessObjects Voyageur™, BusinessObjects Web Intelligence™, and Business Objects Enterprise™. As used herein, the term report refers to information automatically retrieved (i.e., in response to computer executable instructions) from a data source (e.g., a database, a data warehouse, and the like), where the information is structured in accordance with a report schema that specifies the form in which the information should be presented. A non-report is an electronic document that is constructed without the automatic retrieval (i.e., in response to computer executable instructions) of information from a data source. Examples of non-report electronic documents include typical business application documents, such as a word processor document, a spreadsheet document, a presentation document, and the like.

A report document is generally created by a specialized tool including executable instructions to access and format data. A report document where the content does not include external data, either saved within the report or accessed live, is a template document for a report rather than a report document. Unlike other non-report documents that may optionally import external data within a document, a report document by design is primarily a medium for accessing, formatting, and presenting external data.

A report design tool contains executable instructions specifically designed to facilitate working with external data sources. In addition to instructions regarding external data source connection drivers, these instructions may include advanced filtering of data, instructions for combining data from different external data sources, instructions for updating join structures and relationships in report data, and instructions including logic to support a more complex internal data model (that may include additional constraints, relationships, and metadata).

In contrast to a spreadsheet type application, a report generation tool generally is not limited to a table structure but can support a range of structures. A report design tool is designed primarily to support imported external data, whereas a spreadsheet application equally facilitates manually entered data and imported data. In both cases, a spreadsheet application applies a spatial logic that is based on the table cell layout within the spreadsheet in order to interpret data and perform calculations on the data. In contrast, a report design tool is not limited to logic that is based on the display of the data, but rather can interpret the data and perform calculations based on the original (or a redefined) data structure and meaning of the imported data. Spreadsheet applications work within a looping calculation model, whereas report generation tools may support a range of calculation models. Although there may be an overlap in the function of a spreadsheet document and a report document, the applications used to generate these documents contain instructions with different assumptions concerning the existence of an external data source and different logical approaches to interpreting and manipulating imported data.

The content delivery infrastructure for report distribution provides capabilities, such as publishing, that facilitate use of data sources. The publishing process enables centrally coordinated, rule-based control of the generation and delivery of reports and other documents to a variety of BI users. The processing of a single publication may result in the generation of multiple reports, each with its own distinct format, destination(s), and recipient(s). Report generation may be personalized by applying recipient attributes to report templates associated with a publication during the publishing process, resulting in the customization of each report to each recipient. The processing of the publication may also result in publishing of each report to the correct destination(s) and recipient(s).

Although publishing simplifies the generation and distribution of reports to a variety of users and can enable the personalization of each report, it does not, by itself, provide any capability to dynamically obtain information from users related to their interaction with reports. For example, if several users interact with their individual instances of a given report by using the same new feature, there is a need for an automatic mechanism to deliver this usage information to a data source accessible to a user with a need to analyze the information. With access to this information, analysis of the information can proceed to determine metrics such as user adoption of the new feature.

It would be desirable to provide a BI solution for dynamically obtaining data from users of personalized reports, and for writing back the data to a data source. As part of this solution, it would be advantageous to control the write-back process to ensure that each update of a data source is performed only by authorized users. It would also be desirable to analyze write-back data, for example, to track report usage or to determine how users interact with a report.

SUMMARY OF THE INVENTION

This invention includes a computer readable medium with executable instructions to integrate a write-back module in a report document, to publish to a recipient the report document and metadata identifying the recipient, and to update a data source based on received write-back information, including the metadata identifying the recipient.

The invention also includes a computer-readable medium with executable instructions to open a report document including a write-back module, to generate write-back update data in response to a triggering of the write-back module, and to initiate a write-back operation, including transmitting write-back information including the write-back update data and a first type of metadata identifying the originator of the write-back update data.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

The following terminology is used while disclosing embodiments of the invention:

A data source is an information resource. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC) and the like. Data sources may also include a data source where the data is not stored like data streams, broadcast data, and the like.

Canvas is the term for a graphical user interface (GUI) workspace in which a user selects graphical components and associates the graphic components with data values. The canvas can be saved as a working file or be used to generate an interactive control panel that represents the canvas.

Interactive Control Panel is the interactive form of the canvas that is generated from the canvas. In one embodiment of the invention, the interactive control panel is generated as a Macromedia Flash™ file (.swf) that is executable as a standalone application or as a plug-in program that is available on a variety of platforms for a variety of web browsers. An interactive control panel can be understood as interactive graphics representative of input and output data.

Figure 1:
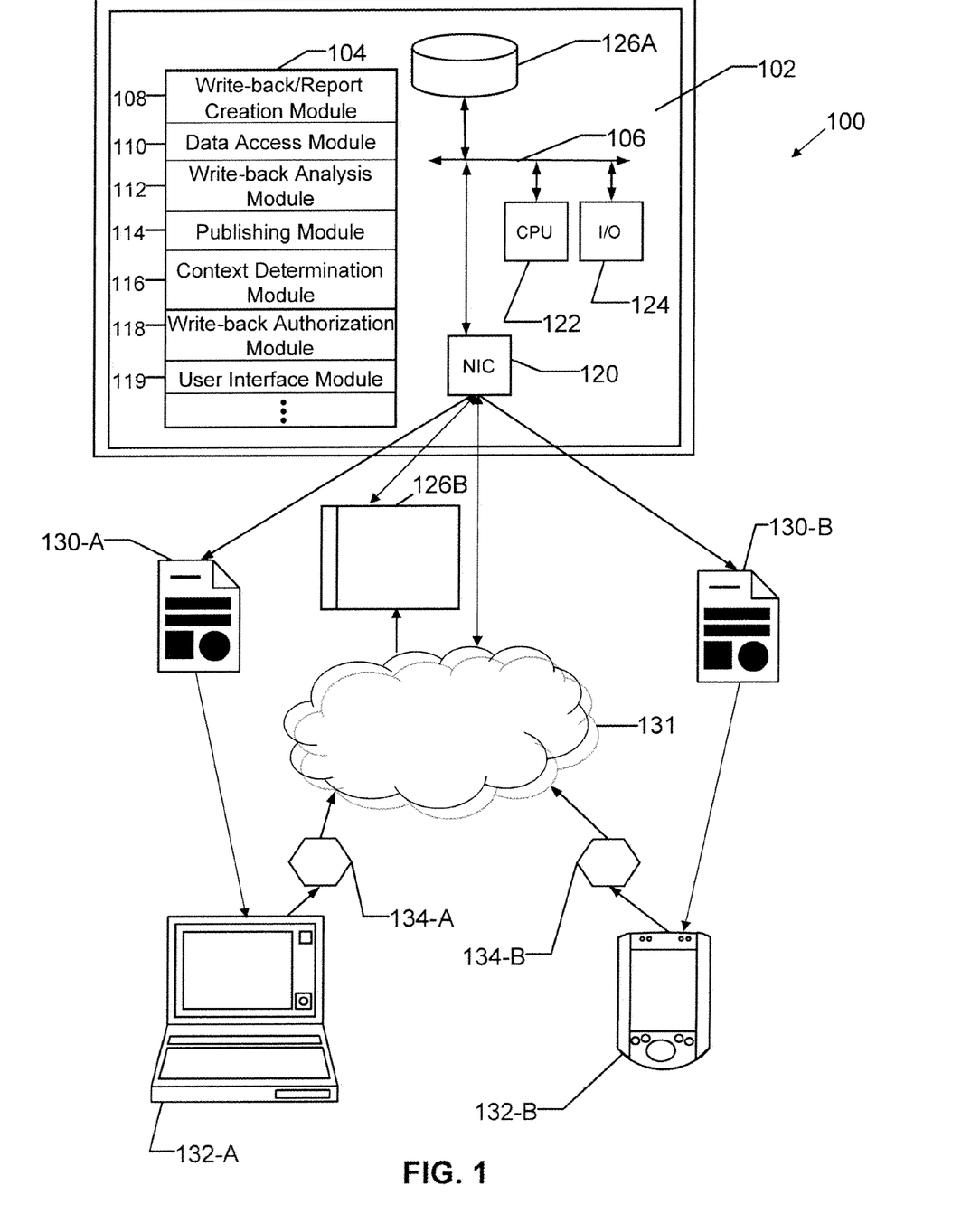
FIG. 1 illustrates a business information system enabling distribution of a report with dynamic write-back to a data source, in accordance with one embodiment of the present invention.

FIG. 1 illustrates a business information system 100 enabling distribution of a report with dynamic write-back to a data source 126, in accordance with one embodiment of the present invention. The BI system 100 includes a network 131 connecting a computer 102 with clients 132A and 132B. The data source 126 may include an internal data source 126A and/or an external data source 126B. The external data source 126B may be located anywhere, but would typically be located on a server computer separate from the computer 102, and accessible using technologies such as web services. The term client refers to a recipient that may be a user of a client computer 132.

The term dynamic write-back refers to an automated mechanism that updates data source 126 based on write-back information 134 generated at a client 132. The write-back information 134 may include write-back update data generated by clients 132 and associated metadata. The write-back update data may include user updates to a report with an integrated write-back module, tracking of the usage of such a report, user requests for product information, and/or customer feedback. The data source 126 may be updated with the write-back update data for several reasons, including to enhance user convenience by storing user updates and refreshing the user view of the report, to make the write-back update data available for analysis, to track user technology adoption, to provide up-sell and cross-sell opportunities, and to collect customer feedback.

The metadata associated with the write-back update data generated by clients 132 may describe the write-back update data, such as by identifying the client 132 that originated the write-back update data. This identification tags write-back update data so that, for example, a first user's expense report entries are not confused with a second user's entries in a different instance of the same expense report. The association of this identification with write-back update data also facilitates the use of personalized reports, which can be customized for and distributed to each client 132 using a publishing process.

The associated metadata may also identify a context for writing back update data to data source 126. This context may enable automated updating of the data source 126 by identifying a specific data source 126A or 126B to be updated by write-back update data generated by a specific client (e.g., 132A).

The computer 102 includes standard components, such as a network interface 120, a CPU 122, input/output devices 124, and an internal data source 126A, which communicate over a bus 106. A memory 104 is also connected to the bus 106. The memory 104 stores a set of executable programs that are used to implement functions of the invention. The clients 132 and the external data source 126B typically include the same standard components.

In an embodiment of the invention, the memory 104 includes executable instructions establishing a write-back/report creation module 108, a data access module 110, a write-back analysis module 112, a publishing module 114, a context determination module 116, a write-back authorization module 118, and a user interface module 119.

The write-back/report creation module 108 may include separate applications, such as for the write-back module creation and report creation functions. Write-back module creation may create a write-back module that can write back and depict data in an interactive analytic framework. Report creation may create reports that contain one or more write-back modules. In one embodiment, the report can act as a data source for the write-back module that it contains.

The data access module 110 accesses data source 126. The write-back analysis module 112 analyzes write-back information stored in data source 126. In one embodiment, the publishing module 114 publishes reports 130A and 130B such that each report 130 contains a write-back module associated with metadata identifying the client 132 receiving each report. The context determination module 116 may optionally determine the context of the received write-back information 134. The write-back authorization module 118 performs authorization prior to allowing an update of data source 126 with received write-back information 134. The user interface module 119 enables the user of computer 102 to interact with the other modules contained in memory 104.

After receiving and subsequently interacting with reports 130A and 130B, clients 132A and 132B may generate write-back information 134A and 134B, respectively. The write-back information 134 may traverse network 131 and may be received at data source 126. In one embodiment, the network 131 may include a web service module running on a computer located within the network 131.

Figure 2:
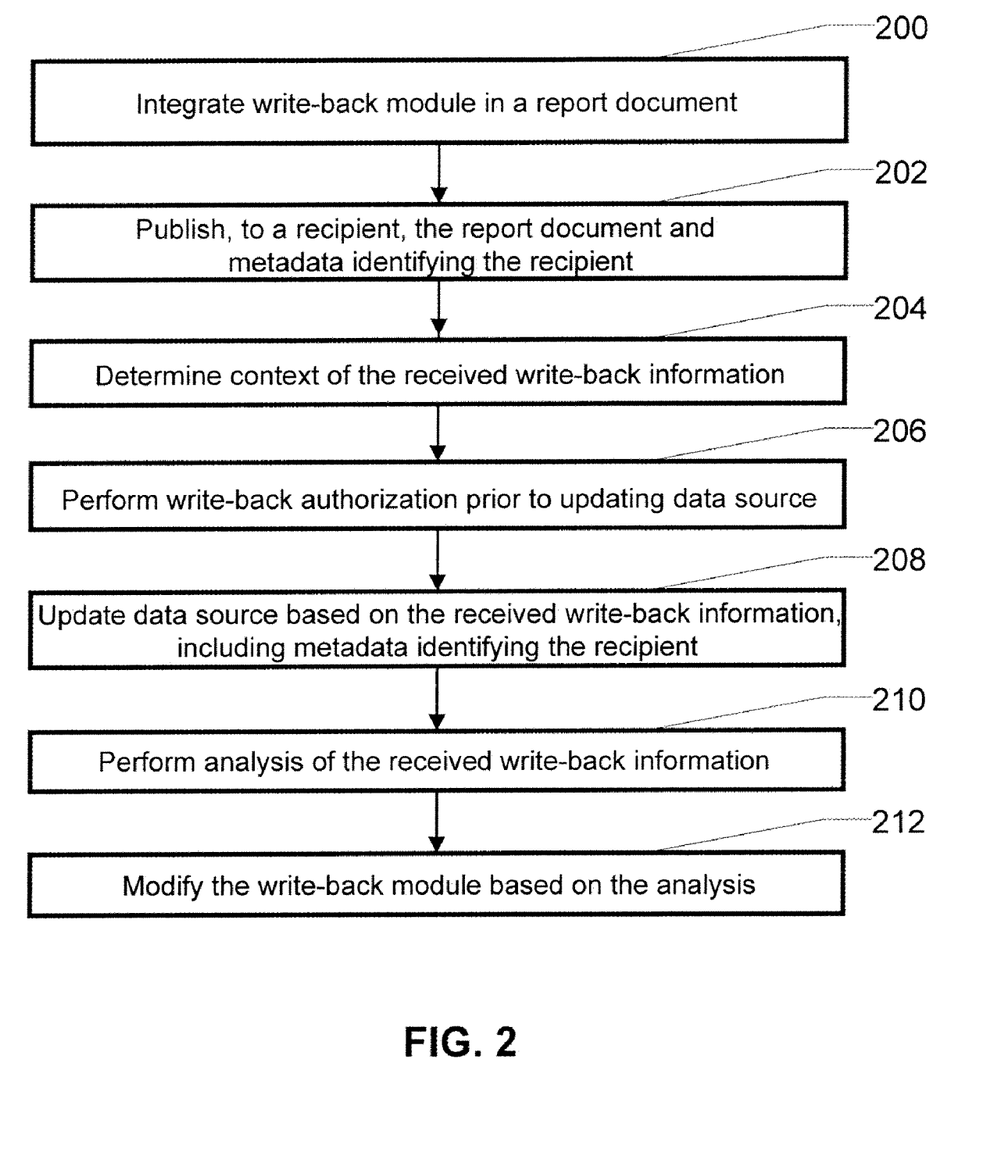
FIG. 2 illustrates operations associated with updating a data source based on received write-back information, in accordance with one embodiment of the present invention.

FIG. 2 illustrates operations associated with updating data source 126 based on received write-back information 134, in accordance with one embodiment of the present invention. The write-back/report creation module 104 integrates a write-back module in a report document (block 200). The write-back/report creation module 104 may also enable a user to design the write-back module by providing input via the user interface module 119.

A report 130 with an integrated write-back module enables data related to user interactions with the report to be captured and written back to the data source 126. In one embodiment, an interactive control panel generated as a Macromedia Flash™ file (.swf) acts as the write-back module. The write-back module provides the framework for a client 132 receiving the report 130 to act. Update data is received in response to triggers of the write-back module. The write-back module may be added to any part of the report 130.

The write-back module may be associated with metadata identifying the client 132 receiving the report 130 containing the write-back module. Metadata may also specify the originator of the write-back update data generated by the write-back module. This association can ensure that write-back update data generated by the write-back module running on client 132 is correctly associated with the client 132.

In one embodiment, the metadata identifying the client 132 may be a delivery destination such as the email or ftp address of the client 132. The metadata may be the same data that the publishing process uses to transmit the report 130. In another embodiment, the metadata identifying a client 132A may anonymously identify the client 132A, such as through a unique user identifier or through a group identifier. The unique user identifier may distinguish write-back update data generated by the client 132A from data generated by other clients 132 without providing an address or other information specifically identifying client 132A. The group identifier may associate write-back update data generated by the client 132A with a group of clients 132, again without providing an address or other information specifically identifying client 132A.

In one embodiment, the write-back module may incorporate one or more aspects, such as a cell, row, column, or table of data, from the report 130 as a source of data for the write-back module. The write-back module may also accept variable values supplied by a user.

The write-back module may contain connection information for a web service located in network 131, such as a delivery destination of the web service. In this embodiment, the write-back module running on client 132 passes the write-back information 134 to the web service. One possible format for information passed to the web service is a name string associated with some other type of information to be captured, such as a value. The web service then writes the write-back information 134 to data source 126 pending authorization (see block 206). This partitioning of functions between the write-back module and the web service may increase the modularity of the design.

Alternatively, the write-back module may contain an identification of data source 126, including a delivery destination for data source 126. In this embodiment, the write-back module may write directly to data source 126 pending authorization (see block 206), so a web service is not required.

The publishing module 114 then publishes, to the recipient (client 132), the report document 130, including the integrated write-back module, and metadata identifying the recipient (block 202). The publishing module 114 may use the data access module 110 to access data stored in data source 126. Each report 130 may be published to one or more clients 132, and may be personalized during the publishing process so that it is customized for its specific client 132. The publication that is processed to generate customized reports may be generated and refreshed by applying settings specific to a client 132. Each report 130 may also be published in a report format such as Crystal Report .rpt, or a non-report format such as Adobe Acrobat .pdf. Additional description of the definition and processing of publications is given in the commonly owned patent application entitled "Apparatus and Method for Defining and Processing Publication Objects," filed Feb. 28, 2007, application Ser. No. 11/680,547, the contents of which are hereby incorporated by reference.

The context determination module 116 may optionally determine the context of the received write-back information 134 (block 204). The context of the write-back information 134A generated by the client 132A may include an identification of a data source 126 to be updated based on the write-back information 134A. The identification of the data source 126 may include the delivery destination of the data source 126. In one embodiment, this context may be provided to a web service located in network 131, so that the web service has the identification of the data source 126 needed for the web service to write back to the data source 126. In another embodiment, this context may be provided to client 132A as metadata associated with the write-back module integrated in report 130A. This write-back module, while running on client 132A, may then use the context information to write to data source 126.

The write-back authorization module 118 may optionally perform write-back authorization prior to an update of the data source 126 (block 206). Write-back authorization may include data level security to authenticate, for example, that write-back update data and associated metadata identifying an originator of the write-back update data have not been corrupted or modified in transmission. In one embodiment, write-back authorization may be implemented with write control logic.

The data access module 110 then updates data source 126 based on received write-back information 134, including metadata identifying the recipient (client 132A) of the write-back module integrated in report 130A (block 208). The data source 126 may be the source of information used to create the report 130A, or could be totally unrelated to the report 130A. In one embodiment, the write-back information 134 may be received from a web service located in network 131. In another embodiment, the write-back information 134 may be received from client 132.

The write-back analysis module 112 may optionally perform analysis of the received write-back information (block 210). Analysis may include refreshing or augmenting data in an existing data source, analyzing general trends in the write-back data, and providing next steps based on predefined interaction logic. These next steps may include providing the client 132 with further data or subscription offers.

The write-back/report creation module 104 may optionally modify or facilitate designer modification of the write-back module based on the analysis. For example, the analysis may determine that several clients 132 are entering similar custom formulas into the write-back module integrated in report 130 to compute values that are subsequently written back to data sources 126. Based on this information, designers may use the write-back/report creation module 104 to modify the write-back module so that a pull-down menu option is available to clients 132 for this computation.

Figure 3:
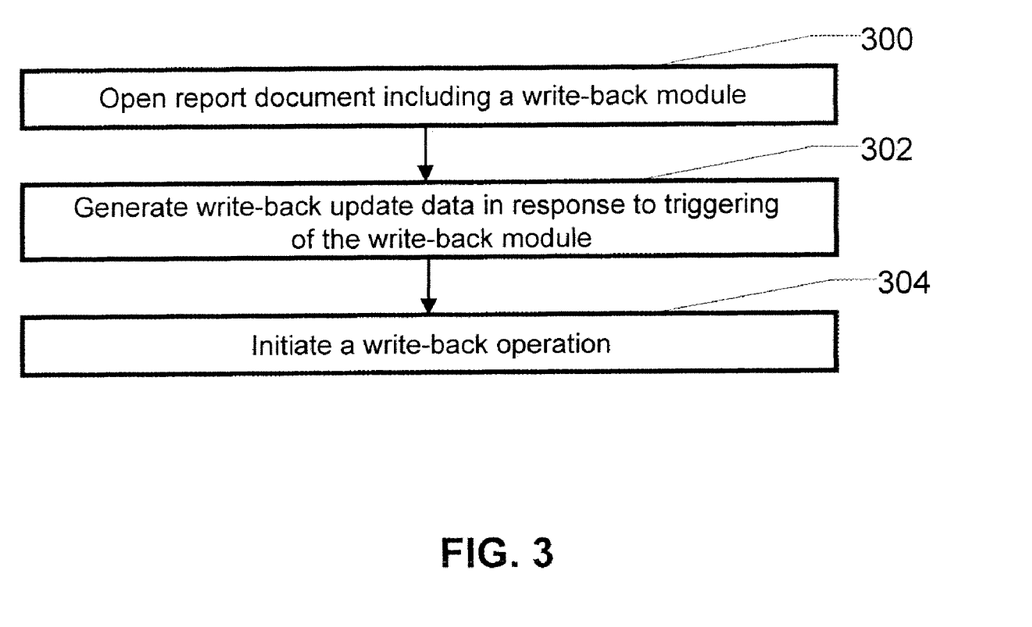
FIG. 3 illustrates operations associated with initiating a write-back operation at a client, in accordance with one embodiment of the present invention.

FIG. 3 illustrates operations associated with initiating a write-back operation at a client 132, in accordance with one embodiment of the present invention. The client 132 opens a report document 130 including a write-back module (block 300). The write-back module may then be available for interaction with a user.

The write-back module then generates write-back update data in response to triggering of the write-back module (block 302). Triggers of write-back may include launching the write-back module, adding variable values to the write-back module such as what-if values or a request for information such as a stock ticker symbol, selecting pre-defined values within the write-back module such as a value for a condition or a plan from a list, commanding the calculation of values by the write-back module, selecting a view of the write-back module, selecting a tab on the write-back module, and selecting a window in the write-back module.

The write-back module then initiates a write-back operation (block 304). In one embodiment, the initiation of a write-back operation may include the opening of a connection to a web service located in network 131. The identification of the web service may be associated with the write-back module as part of the design of report 130 (block 200). The write-back module then transmits, to the web service, write-back information 134 including the generated write-back update data (block 302) and metadata identifying client 132 as the originator of the write-back update data. The write-back module and this metadata may be associated as part of the design of report 130 (block 200). The context of the write-back operation to data source 126 may be obtained by the web service from computer 102, which includes the context determination module 116 that determines the context. The web service may then update data source 126 based on the write-back information 134. Alternatively, the web service may process the write-back information.

In another embodiment, the initiation of a write-back operation may include the opening of a connection to a computer 102 containing a data source 126A, or directly to an external data source 126B. To obtain the context of this write-back operation to data source 126, the write-back module may obtain the identification of the data source 126 from metadata that may be associated with the write-back module as part of the design of report 130 (block 200, block 206). The write-back module then updates data source 126 with write-back information 134 including the generated write-back update data (block 302) and additional metadata identifying client 132 as the originator of the write-back update data. The write-back module and this additional metadata may also be associated as part of the design of report 130 (block 200).

Figure 4:
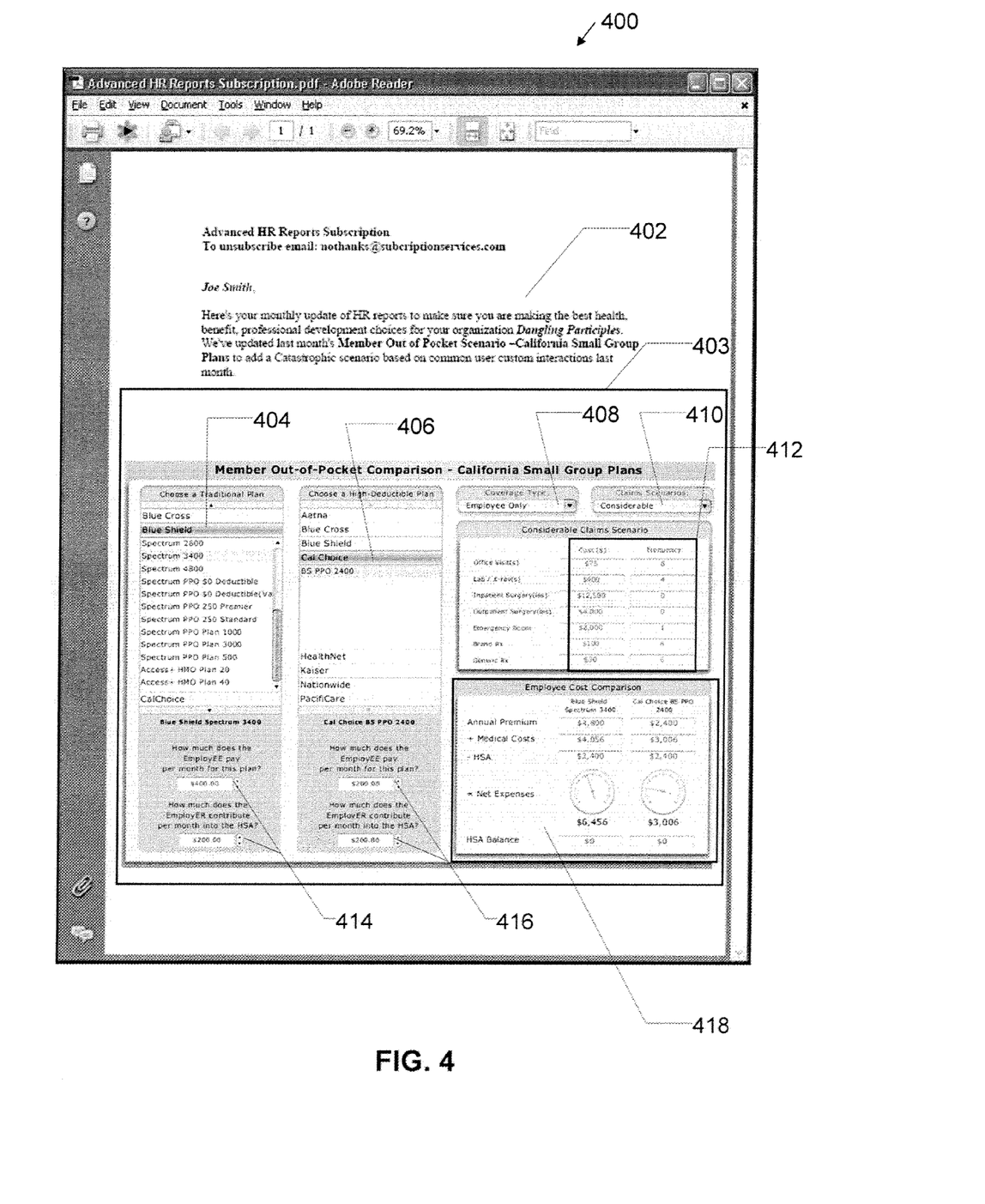
FIG. 4 illustrates an example of a report with an integrated write-back module, in accordance with one embodiment of the present invention.
Figure 4A:
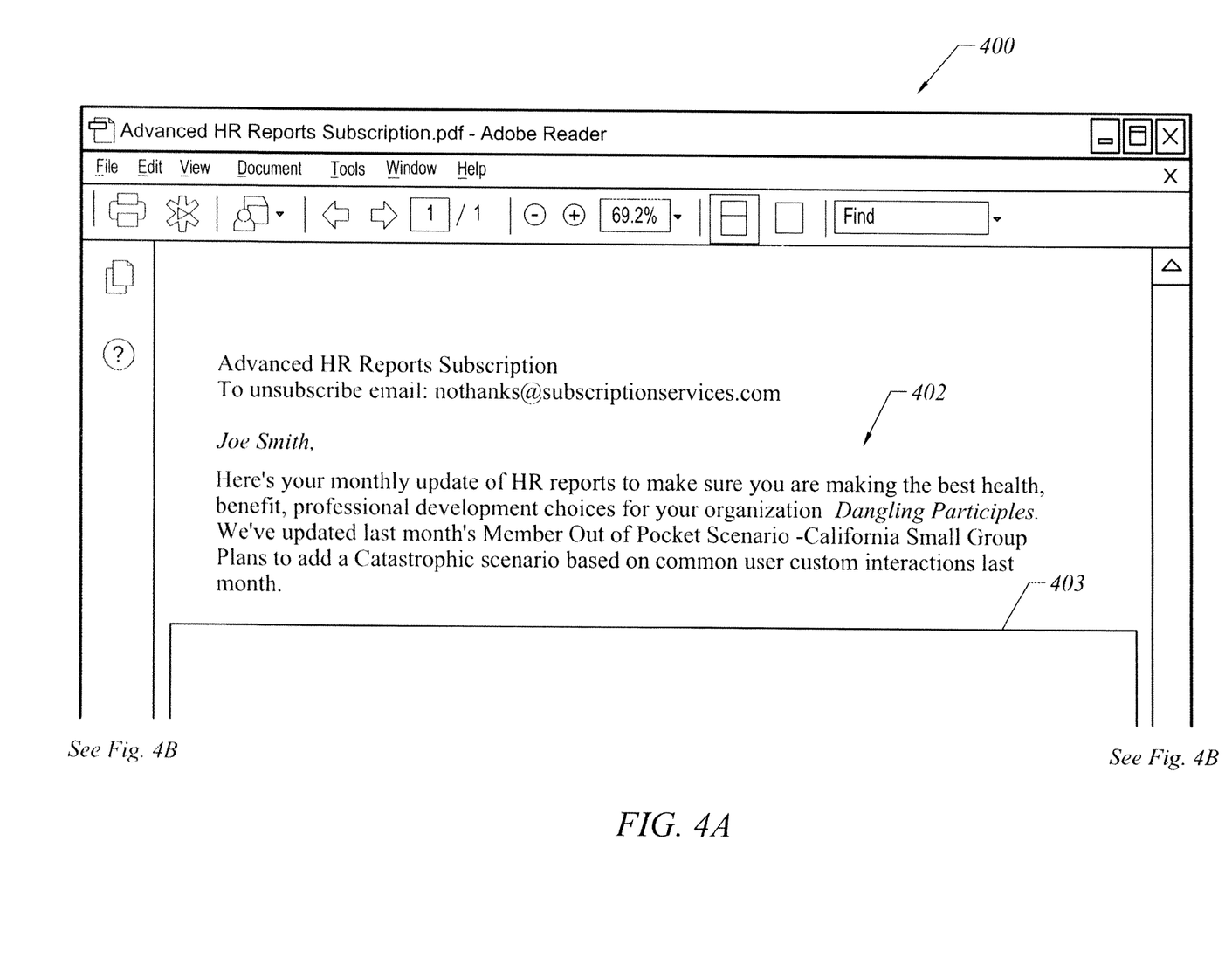
Figure 4B:
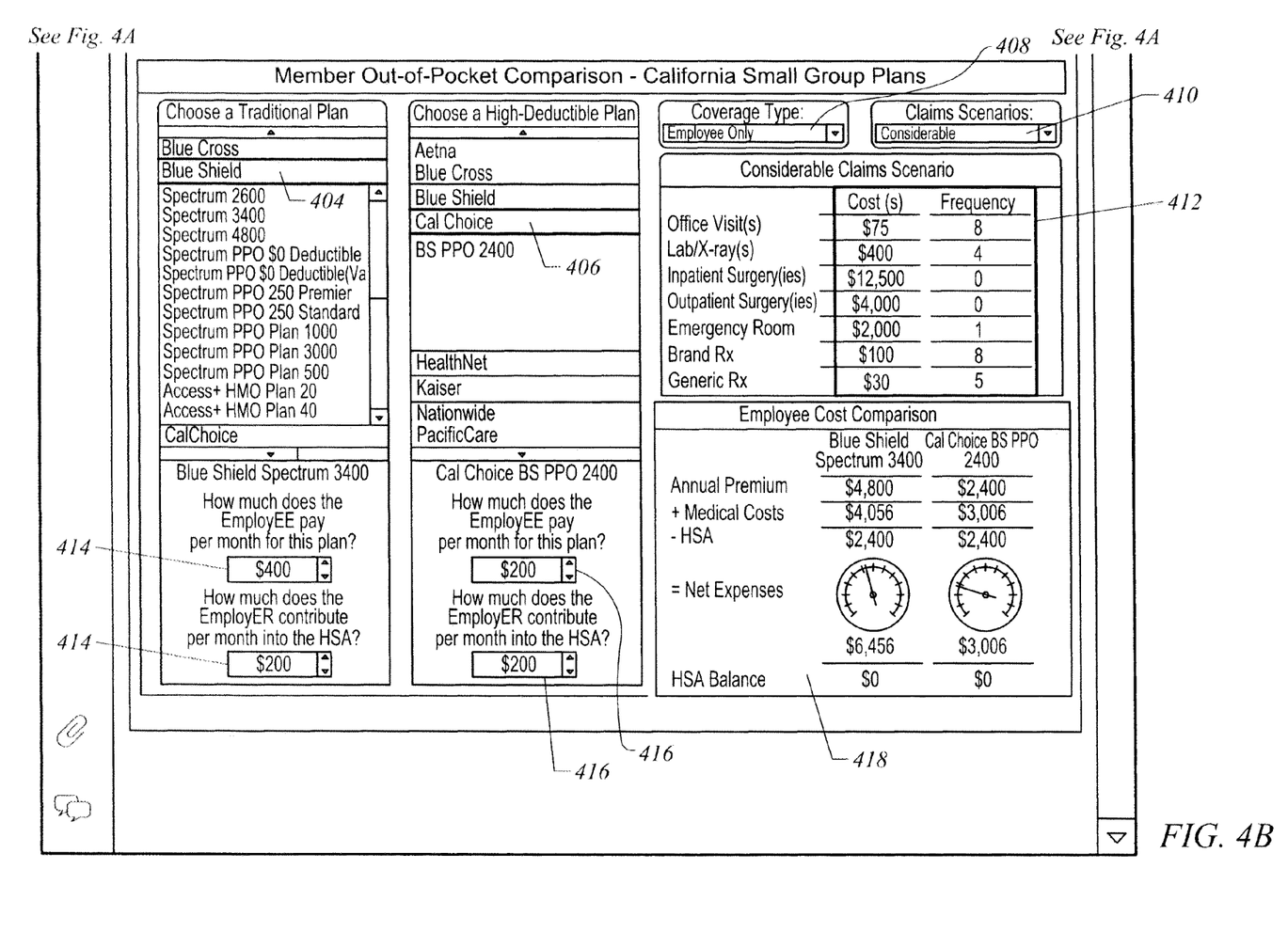

FIG. 4 illustrates an example of a report with an integrated write-back module, in accordance with one embodiment of the present invention. In this example, a report 403 and custom text 402 are published in document 400, which has a non-report .pdf format. The report 403 has an integrated write-back module. Window panes 404, 406, 408, and 410 indicate values available for user selection, where the selection updates summary pane 418. The selection of values may enable the customization of other values. For example, selecting a custom option for Claims Scenarios pane 410 enables the editing of values in the fields indicated by window pane 412. Window panes 414 and 416 indicate values that can be specified as custom values by typing in a field or adjusting a value upward or downward using arrows. Optionally, default values may be supplied for any of the selectable or editable values. The values in the summary pane 418 are calculated based on the values selected in the other window panes.

User interaction with the write-back module integrated in report 403 can be used to trigger write-back to data source 206. The custom text field 402 suggests, for example, that customizations by users in the past suggested the need for a "Catastrophic Scenario" that has been added to the write-back module. This example shows that users supplied what-if values that were higher than those in an existing claims scenario, and that based on this, modifications were made to the published write-back module to provide a scenario that reflects the common user customizations (block 212).

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable medium, comprising executable instructions for execution by at least one data processor to:

generate a customized report for a recipient, wherein the customized report includes a pane that indicates values that can be specified as custom values, wherein the report includes information automatically retrieved from a database in response to executable instructions associated with the report and the information is structured in accordance with a report schema that specifies the form in which the information is presented, wherein the pane is an interactive control panel operative as a write-back module, the write-back module (i) writing back data and depicting data in an interactive analytic framework and (ii) creating reports that contain one or more write-back modules;

deliver the report to the recipient;
collect from the recipient custom values specified in the pane as write-back update data;
determine context of the collected custom values, the context including an identification of the data source and a delivery destination of the data source; and
update a data source based on received write back data including metadata identifying the recipient;
wherein:
  write-back authorization is performed prior to updating the data source,
  the write-back authorization includes data level security to authenticate that the write-back update data and associated metadata has not been corrupted or modified in transmission;
  analysis of the received write-back authorization is performed to determine that a modification should be made to the write-back module; and
  the write-back module in the report is modified based on the analysis.

2. The computer readable medium of claim 1 wherein the write-back authorization is based upon the identity of the recipient.

3. The computer readable medium of claim 1 wherein the executable instructions to update include executable instructions to initially deliver the custom values to a web service.

4. The computer readable medium of claim 3 wherein the executable instructions to update include executable instructions to deliver the custom values from the web service to the data source.

5. The computer readable medium of claim 3 wherein the custom values are delivered to the web service as a name string.

6. The computer readable medium of claim 1 wherein the report includes metadata identifying the recipient.

7. The computer readable medium of claim 6 wherein the metadata anonymously identifies the recipient.

8. The computer readable medium of claim 7 wherein the metadata identifies the recipient by group association.

9. A method for implementation by one or more data processors comprising:
  generating, by at least one data processor, a customized report for a recipient, wherein the customized report includes a pane that indicates values that can be specified as custom values, wherein the report includes information automatically retrieved from a database in response to executable instructions associated with the report and the information is structured in accordance with a report schema that specifies the form in which the information is presented, wherein the pane is an interactive control panel operative as a write-back module, the write-back module (i) writing back data and depicting data in an interactive analytic framework and (ii) creating reports that contain one or more write-back modules;
  delivering, by at least one data processor, the report to the recipient;
  collecting, by at least one data processor, from the recipient custom values specified in the pane as write-back update data;
  determining, by at least one data processor, context of the collected custom values, the context including an identification of the data source and a delivery destination of the data source; and
  updating, by at least one data processor, a data source based on received write back data including metadata identifying the recipient;
wherein:
  write-back authorization is performed prior to updating the data source,
  the write-back authorization includes data level security to authenticate that the write-back update data and associated metadata has not been corrupted or modified in transmission;
  analysis of the received write-back authorization is performed to determine that a modification should be made to the write-back module; and
  the write-back module in the report is modified based on the analysis.

10. The method of claim 9 wherein the write-back authorization is based upon the identity of the recipient.

11. The method of claim 9, wherein the updating comprises initially delivering the custom values to a web service.

12. The method of claim 11 wherein the custom values are delivered to the web service as a name string.

13. The method of claim 9 wherein the report includes metadata identifying the recipient.

14. The method of claim 13 wherein the metadata anonymously identifies the recipient.

15. The method of claim 14 wherein the metadata identifies the recipient by group association.

16. A system comprising:
  at least one data processor;
  memory storing instructions, which when executed, cause the at least one data processor to perform operations comprising:
    generating a customized report for a recipient, wherein the customized report includes a pane that indicates values that can be specified as custom values, wherein the report includes information automatically retrieved from a database in response to executable instructions associated with the report and the information is structured in accordance with a report schema that specifies the form in which the information is presented, wherein the pane is an interactive control panel operative as a write-back module, the write-back module (i) writing back data and depicting data in an interactive analytic framework and (ii) creating reports that contain one or more write-back modules;
  delivering the report to the recipient;
  collecting from the recipient custom values specified in the pane as write-back update data;
  determining context of the collected custom values, the context including an identification of the data source and a delivery destination of the data source; and
  updating a data source based on received write back data including metadata identifying the recipient;
wherein:
  write-back authorization is performed prior to updating the data source,
  the write-back authorization includes data level security to authenticate that the write-back update data and associated metadata has not been corrupted or modified in transmission;
  analysis of the received write-back authorization is performed to determine that a modification should be made to the write-back module; and
  the write-back module in the report is modified based on the analysis.

17. The system claim 16 wherein the write-back authorization is based upon the identity of the recipient.

18. The system of claim 16, wherein the updating comprises initially delivering the custom values to a web service; and wherein the custom values are delivered to the web service as a name string.

19. The system of claim 16 wherein the report includes metadata anonymously identifying the recipient.

* * * * *